United States Patent [19]

Royce

[11] 3,874,527
[45] Apr. 1, 1975

[54] VEHICLE MOUNTED ACCESS RAMP FOR WHEELCHAIR USERS

[76] Inventor: Robert E. Royce, 4345 S. Santa Fe Dr., Englewood, Colo. 80110

[22] Filed: Jan. 24, 1973

[21] Appl. No.: 326,451

[52] U.S. Cl. .................... 214/77 R, 14/71, 214/85, 296/61
[51] Int. Cl. .............................................. B60p 1/44
[58] Field of Search ........ 214/77 R, 77 P, 75 R, 85, 214/85.1; 14/71; 244/129 D, 137 R; 296/61

[56] References Cited
UNITED STATES PATENTS

| | | | |
|---|---|---|---|
| 1,528,090 | 3/1925 | Tracy | 296/61 |
| 2,783,080 | 2/1957 | Ringsby | 296/61 X |
| 3,118,551 | 1/1964 | Stewart | 214/77 R |
| 3,169,282 | 2/1965 | Godwin | 244/129 D |
| 3,352,440 | 11/1967 | Wilson | 214/85 |
| 3,411,169 | 11/1968 | Guerke | 14/71 |
| 3,544,046 | 12/1970 | Belolipetsky et al. | 244/129 D |
| 3,651,965 | 3/1972 | Simonelli | 214/85 X |
| 3,710,962 | 1/1973 | Fowler | 214/75 R |
| 3,711,882 | 1/1973 | Iller | 214/85 X |

Primary Examiner—Robert J. Spar
Assistant Examiner—Leslie J. Paperner

[57] ABSTRACT

A vehicle mounted access ramp for use by persons confined in wheelchairs. A vehicle mounted door is modified to hinge in to and out of its closed position about a hinge assembly having a horizontal axis extending along or below the lower edge of the door opening. The inner surface of the door is modified to provide a smooth and continuous ramp surface. The modified door is raised and lowered about the horizontal hinge axis by a power lift assembly which includes a rotatable shaft extending along the upper edge of the door opening and driven in rotation by a reversible motor coupled to the shaft through a worm drive. Flexible straps wound upon the shaft are connected to the door near its upper edge. An approach ramp pivoted along the normal upper door edge provides a smooth ramp surface from the ground to the inner door surface when the door is lowered to a position wherein its normal upper end rests on the ground. The approach ramp is coupled to the lift straps to be pivoted to an upraised safety gate position when tension is applied to the lift straps to prevent a wheelchair from inadvertently rolling from the ramp during the raising or lowering of the door. A second or access ramp pivoted to the vehicle floor bridges the gap between the lower door edge and the vehicle floor when the door is fully or partially lowered. Control buttons for controlling operation of the lift motor are located at the exterior of the vehicle, upon a control pedestal accessible to a person on the ramp assembly and in the interior of the vehicle.

13 Claims, 7 Drawing Figures

PATENTED APR 1 1975  3,874,527
SHEET 1 OF 2
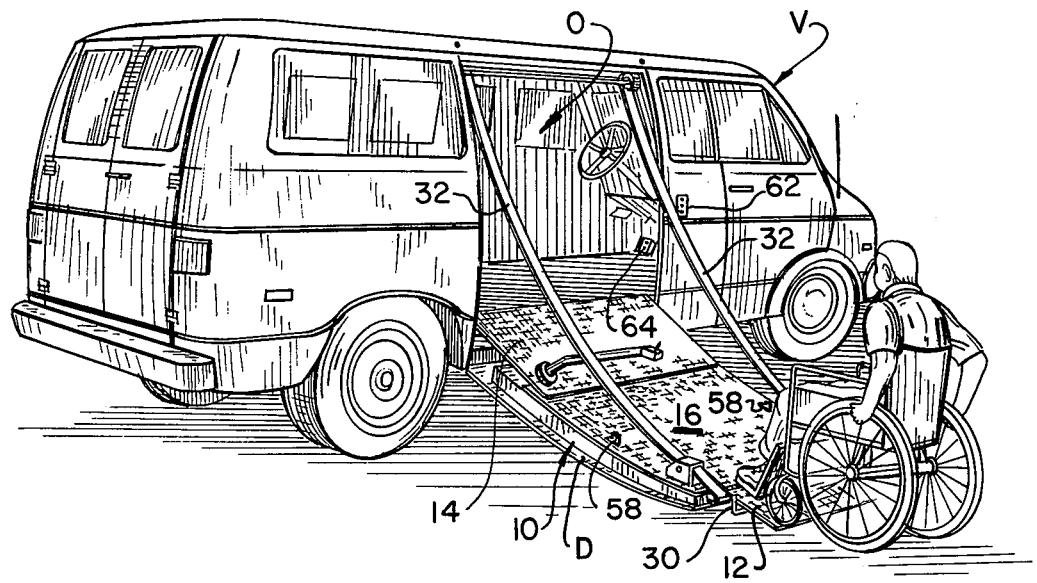
Fig_1
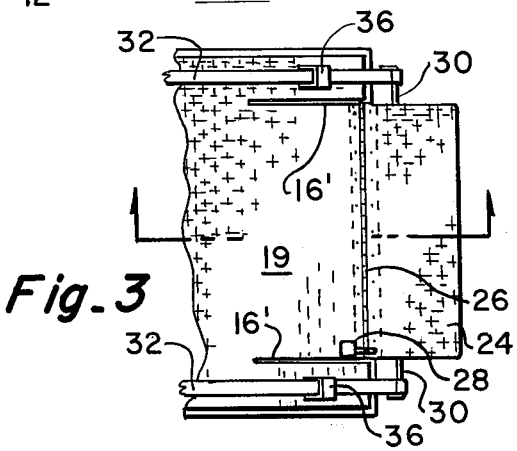
Fig_3
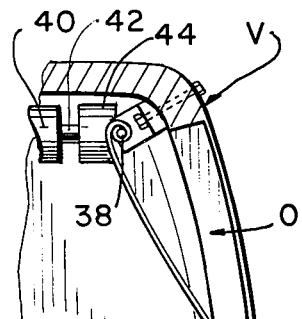
Fig_2
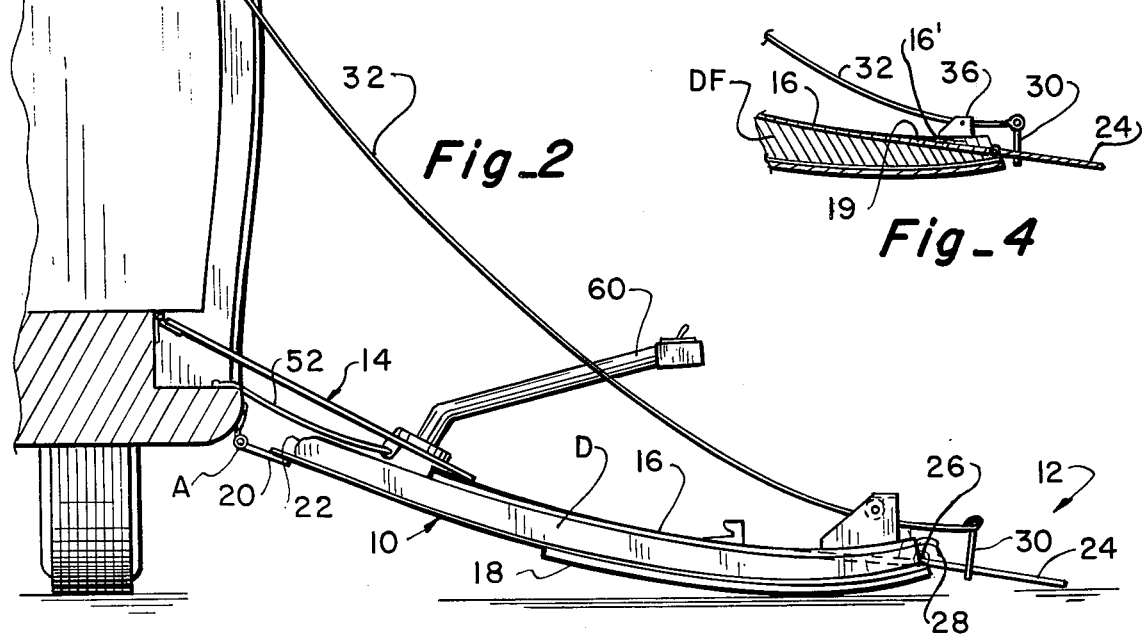
Fig_4

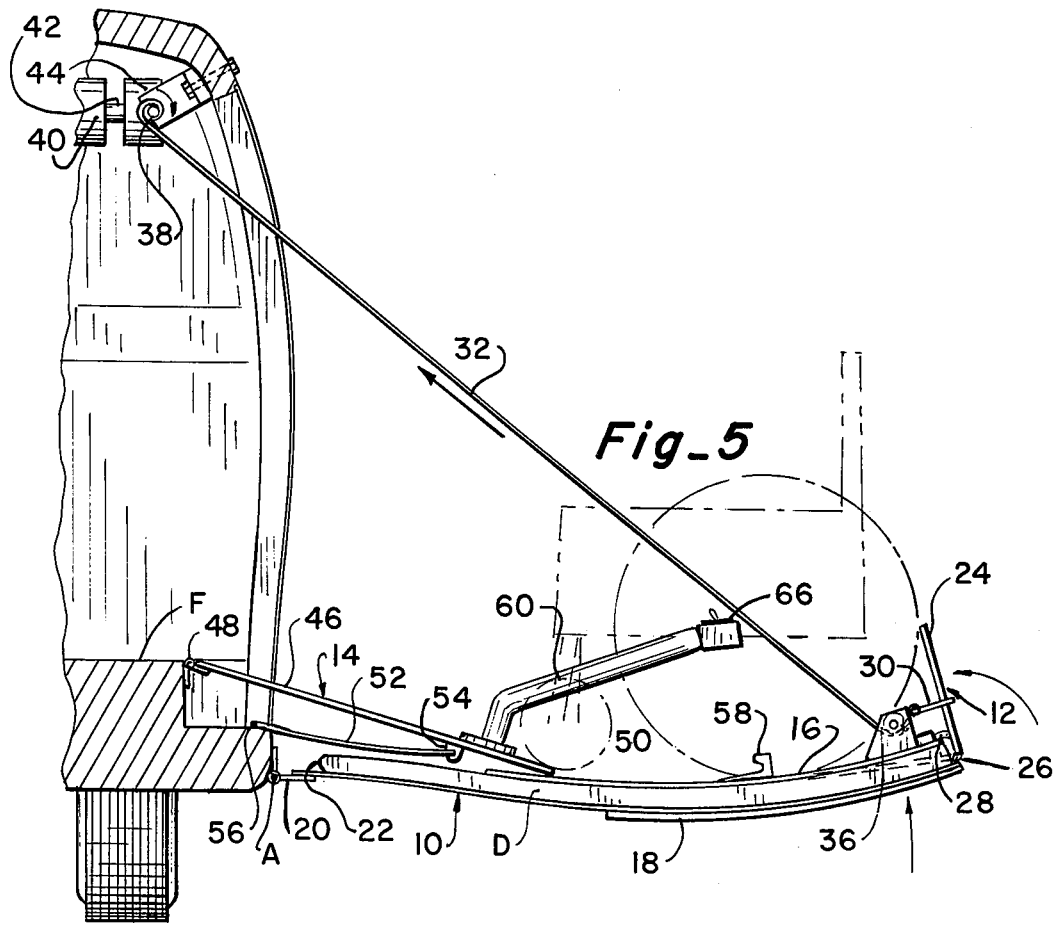
Fig_5
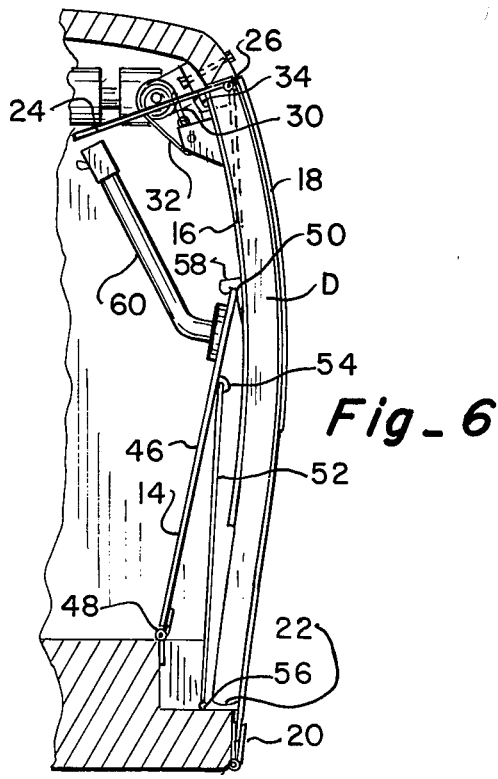
Fig_6
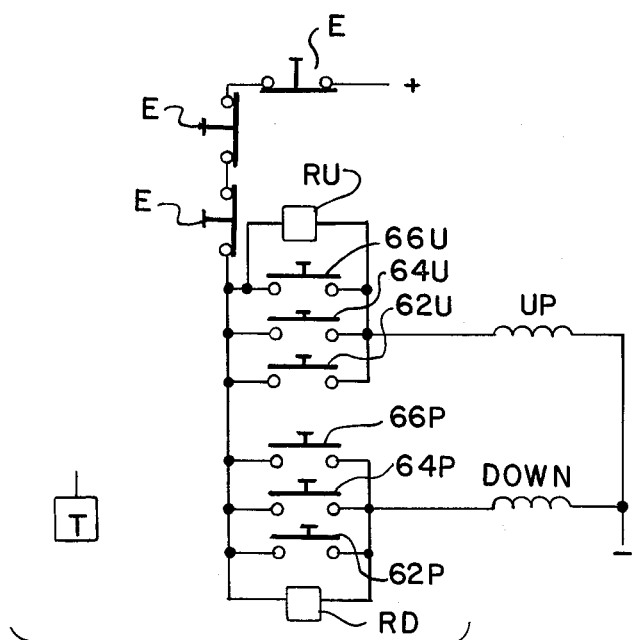
Fig_7

VEHICLE MOUNTED ACCESS RAMP FOR WHEELCHAIR USERS

BACKGROUND OF THE INVENTION

The present invention is especially directed to the provision of a vehicle mounted ramp assembly which can conveniently be used by persons confined to wheelchairs to enable them to enter or leave the vehicle without requireing assistance from others. Many persons confined to wheelchairs are fully capable of driving motor vehicles by the use of hand controls, but find their opportunities to do so restricted by the fact that they require assistance in entering and leaving the vehicle. While various forms of elevating platforms, etc. for assisting such persons in to and out of a vehicle are found in the prior art — see for example Ridgeway U.S. Pat. No. 3,258,139 and Simonelli et al U.S. Pat. No. 3,651,965 — the prior art structures usually are difficult for the wheelchair confined person to control by himself. Further, in the usual case, the prior art devices employ a vertically movable horizontal platform which poses problems when the vehicle is not parked on level ground. The present invention is especially designed to provide a ramp which is easily used and conveniently controlled by a wheelchair confined person for entering and leaving the vehicle.

SUMMARY OF THE INVENTION

In its preferred form, the present invention is achieved by modifications to a commercially available van-type vehicle having double opening side doors on a sliding side door on the curb side of the vehicle. A preferred example of such a van is sold by Chrysler Corporation as the Dodge Royal Sportsman Van. This particular type of vehicle is preferred because of its relatively high head room and the wide door opening provided by the double doors.

The ramp of the present invention is constructed by removing the doors from the van, attaching them together into a single rigid unit and remounting the now unitary door on the vehicle by hinges located below the lower edge of the door opening and pivoting the door into and out of its opening about a horizontal axis. The normal inner surface of the door is covered with a metal plate to provide a smooth and continuous ramp surface, while the upper outer side of the door is also covered with a metal panel because this portion of the door will rest on the ground when the door acts as a ramp. Flexible straps are wound upon a reversible power driven rotary shaft mounted in the vehicle interior along the upper edge of the door opening and are coupled to the door to provide a controlled raising and lowering of the door about the hinge axis. An approach ramp is pivotally mounted upon the normal upper edge of the door to provide a ramp surface extending from the ground to the inner door surface when the ramp is lowered and resting on the ground. The lift straps are passed beneath the rollers on the inner door surface and coupled to cranks upon the approach ramp so that whenever tension is applied to the lift straps, the approach ramp is pivoted upwardly into approximate perpendicular relationship to the inner door surface to act as a safety gate prohibiting movement of a wheelchair off of the outer end of the ramp during raising and lowering of the ramp. If the ramp is lowered to the point where the door rests upon the ground, release of tension from the lift straps combined with a spring pivots the approach ramp downwardly to provide a ramp extension. A second ramp in the form of a rectangular plate pivoted to the vehicle floor along the lower edge of the door opening has its opposite edge slidably resting upon the inner surface of the door during raising and lowering movement and bridges the gap between the inner door surface the vehicle floor when the ramp is in a fully or partially lowered position. The reversible lift motor is controlled by up and down switches or by a remote control unit of the type employed in automatic garage openers. Where switches are employed, they are preferably provided at three locations, one set being located at the exterior of the vehicle adjacent one side of the ramp. This set of switches is conveniently supplied in the form of a two-position key operated switch. A second set of switches is located in the interior of the van preferably in a position easily reached by the driveer. A third set of controls in the form of switches is located upon a control pedestal mounted upon the access ramp, the switches being located on the pedestal at a position easily accessible to a person seated in a wheelchair located on the ramp so that raising and lowering of the ramp is fully under the control of the person using the ramp. The control circuit may include a switch operating receiver for use in combination with a remote control transmitter and also emergency shut-off switches. The worm drive coupling between the lift drive motor and rotary shaft provides a self-braking action which will lock the ramp at any position it may be in merely by deenergizing the drive motor.

Other objects and features of the invention will become apparent by reference to the following specification and to the drawings.

IN THE DRAWINGS

FIG. 1 is a perspective view of a van embodying the present invention;

FIG. 2 is a cross-sectional view taken on a vertical plane showing the ramp of the present invention and a partial cross-section of the van;

FIG. 3 is a plan view of the outer end portion of the ramp in its lowered position;

FIG. 4 is a cross sectional view taken on line 4—4 of FIG. 3;

FIG. 5 is a cross-sectional view similar to FIG. 2 showing the ramp in a partially raised position;

FIG. 6 is a cross-sectional view similar to FIG. 5 showing the ramp in its fully raised or door-closed position;

FIG. 7 is a schematic diagram of an electrical control circuit.

Referring first to FIG. 1, the present invention is shown as being applied to a commercially available van V such as a Dodge Royal Sportsman, which is supplied by the manufacturer with a curb side door opening O of substantial width and height. As supplied by the manufacturer, the door opening O is normally closed by a set of double doors hinged respectively on the vertical front and rear edges of the door opening, the doors closing in a self-mating engagement which does not require a central door post. When adapted for use by wheel chair confined persons, the front driver's side seat is normally removed and wheelchair locking mechanism and vehicle hand controls of known construction not directly relevant to the present invention will be provided. The ramp of the present invention consists of three ramp elements—namely a main or door ramp 10, an approach ramp 12 and an access ramp 14.

Door ramp 10 is contructed from the originally supplied double doors of the vehicle by removing the doors and their original hinges and fixedly and rigidly attaching the two doors to each other to form a single rigid door assembly D. The major portion of the inner surface of the modified door D is covered with a sheet of aluminum decking plate 16 to provide a substantially smooth and continuous surface along which a wheelchair may roll. Preferably, the upper or exposed surface of decking plate 16 is formed with a pattern of slightly projecting ribs to provide a frictional surface which will resist slippage of the wheels of a wheelchair. A similar panel 18 of the same material is mounted along the normal upper portion of the outer surface of the combined door D because, as best seen in FIG. 2, this surface will rest upon the ground when the ramp is in a fully lowered position, the panels 16 and 18 also serving to hold the two doors together. In some cases, panels 16 and 18 may take the form of an open grid to provide visibility through the ramp, the original equipment windows being left in place in this event.

In order to reduce the incline and minimize the barrier presented by the upper door edge to a rolling entry from the ground to the ramp, a central portion of the top of the door frame DF (FIG. 4) is cut away and slits 16' (FIG. 3) are cut in panel 16 to permit an outer end portion 19 to be depressed to form a gently inclined surface passing through the thickness of door D.

After modification in the manner described above, the door is remounted on the vehicle by a hinge assembly 20 which provides a fixed horizontal hinge axis A which extends parallel to the lower edge 22 of the door at a location spaced downwardly from lower edge 22 when the door is in its upright or fully closed position. The purpose of this vertical offset of the hinge axis from the lower door edge will be explained below in connection with the operation of the ramp assembly.

Approach ramp 12 takes the form of a rectangular plate 24, preferably of the same aluminum decking material employed for plates 16 and 18, which extends along the upper edge of the assembled door D for the complete width of depressed portion 19 and is connected to the door by a hinge 26 whose hinging axis extends along the upper edge of the inner surface of door D. A torsion spring 28 (FIGS. 2 and 3) resiliently biases plate 24 in a clockwise direction as viewed in FIGS. 2 and 4 about hinge 26 toward the ground engaging ramp position shown in FIG. 2. At locations offset from hinge 26 and at the offset end edges of plate 24, anchor assemblies 30 are respectively connected to one end of each of a pair of lift straps 32 which are employed to raise or lower the ramp assembly.

Roller brackets 36 fixedly mounted on the inner surface of door D near each side edge limit pivotal movement of plate 24 in a counterclockwise direction as viewed in FIGS. 2 and 4. Plate 24 is moved in a direction carrying anchors 30 toward and against brackets 36 whenever tension is applied to lift straps 32, and thus during raising and lowering of the door, plate 24 projects upwardly relative to the inner surface of door D to act as a safety gate or barrier which will prevent a wheelchair from rolling up or off the outer end of the ramp assembly. Raising of the door from the fully lowered position of FIG. 2 cannot occur until anchors 30 engage brackets 36.

Raising and lowering of the ramp is under the control of lift straps 32 which pass from anchors 30 on plate 24 underneath rollers in roller brackets 36. From rollers 36, straps 32 extend upwardly and have their opposite ends anchored upon a rotary lift shaft 38 mounted for rotation in the interior of the vehicle about an axis extending parallel to and closely adjacent the upper edge of door opening O. Shaft 38 is driven in rotation in either direction by a reversible electric motor drive designated generally 40 in which the motor shaft 42 is coupled to lift shaft 38 via a worm gear drive connection 44.

Access ramp 14 includes a rectangular plate 46 preferably of the same aluminum decking material employed for plates 16, 18 and 24, which is hingedly mounted as by hinge 48 extending along one edge of plate 46 flush with the floor F of the vehicle. During raising and lowering movement of the ramp assembly, the opposite edge 50 of plate 46 freely slides along the surface of plate 16. Extensible straps of rubber or similar material 52 are connected between an anchor 55 on the underside of plate 46 and a point 56 on the vehicle frame which is outwardly offset from axis 48. Except for a resilient resistance imposed by straps 52, plate 46 is free to pivot about its hinge 48 and is normally maintained in contact with plate 16 during raising and lowering movement of the door primarily by gravity. Referring to the door closed position of the assembly shown in FIG. 6, it is seen that in this position, straps 52 are extended and the distal edge 50 of plate 46 is seated within slots in anti-rattle brackets 58 mounted on plate 16. Two brackets 58 are employed, one near either side edge of the assembled door D and hold plate 46 away from the inner surface of door D when in the closed position to prevent the plate from rattling against the inner surface of the door. Straps 52 exert a clockwise pivotal bias on plate 46 as viewed in FIG. 4, firmly seating plate 46 against one side of the slot in brackets 58 and also providing a door opening bias for purposes discussed below.

A control pedestal 60 is mounted upon and movable with plate 46 of access ramp 14.

Control switches for controlling operation of lift drive motor 40 are provided at at least three locations. A first pair of control switches 62 are located on the exterior of the vehicle, preferably adjacent one side of door opening O at a location such that they may be easily reached by a person seated in a wheel chair. Preferably, control switches 62 will include a key operated switch, the key to which may match the ignition or door lock of the vehicle, to prevent unauthorized operation of the ramp. A second control station 64 (FIG. 1) is located at the interior of the vehicle on the engine housing while a third set of control switches 66 are located at the distal end of the control pedestal 60. The three control switch loations, 62, 64 and 66, may be augmented by an additional control stations (not shown) located as desired and also, if desired, by a remote control switch operating receiver responsive to a remote transmitter T' (FIG. 5) of the type employed in automatic garage door opening systems. In any event, the remote control, if used, and the various control switch locations are chosen to conveniently place control of operation of the ramp assembly in a person seated in a wheelchair so that assistance by others is not required to operate the ramp during entering or leaving of the vehicle.

Referring briefly to FIG. 7, an exemplary form of switch stations, such as control station 62, will include two normally opened, manually operable control switches such as 62U and 62D. Motor 40 is driven in raising movement uponn energization of an UP solenoid, with parallel connected switches 62U, 64U and 66U at the respective control stations, being alternatively closed to energize the UP solenoid. A similar arrangement is employed with the DOWN solenoid which, when energized, causes motor 40 to drive in a reverse or lowering direction. Where remote control units are employed, up and down receiver actuator switches RU and RD, actuated by a transmitter T are connected as indicated.

Preferably, each control station also includes an emergency stop switch E, which when actuated cuts the power to the drive motor, the worm drive effectively locking the ramp assembly against movement upon de-energization of the motor.

Operation of the ramp system is as follows. The operator approaches the vehicle with the ramp assembly in the door-closed position of FIG. 6 and, by manipulation of either a remote control transmitter T or the down switch of control station 62 energizes motor 40 in its ramp lowering direction. Lift straps 32 act only in tension and thus the motive force for lowering the assembly from the closed position of FIG. 6 is supplied by gravity, motor 40 acting as a brake to lower the assembly at a controlled rate. Referring to FIG. 6, when the door assembly is in its closed position, it is in a substantially vertical position with little or no forces of gravity acting on the assembly to swing it outwardly about its hinge 20. The initial door opening force is supplied by the stretched resilient straps 52 which, because of the offset between hinge point 48 of plate 46 and the frame mounted end 56 of strap 52, exerts a force resiliently biasing plate 46 about its hinge 48 in a clockwise direction as viewed in FIG. 6. This biasing action is sufficient to start the ramp assembly swinging outwardly in a clockwise direction about the axis of hinge 20 until the center of gravity of the assembly has moved outwardly beyond its mounting hinge axis A. At this point the gravitational forces act to continue lowering of the ramp assembly under the controlling action of motor 40. Assuming that lowering is under control from the switch at station 62, switch 62D is held closed until after scuff plate 18 is resting on the ground as viewed in FIG. 2 to give some slack in lift straps 32 so that torsion spring 28 can pivot the approach ramp 24 outwardly into the ground contacting position shown in FIG. 2. The wheelchair is then rolled onto the inner surface of door D, passing upwardly over approach ramp 12 as illustrated in FIG. 1, and depressed portion 19 of the ramp surface of the door until the control buttons on pedestal 60 can be reached. It may be noted at this point that by hinging door D about an axis A which is displaced downwardly below the lower edge of the door, the angle of inclination of the inner surface of the door as viewed in FIG. 2 is reduced.

In order to reach the control switches on control pedestal 60, the wheelchair must be rolled onto plate 16 on the inner surface of door D. The control switch 66U on control pedestal 60 is then depressed to cause motor 40 to drive in the ramp raising position by applying tension to lift straps 32. As tension is applied to the lift straps, approach ramp plate 24 is swung upwardly about hinge 26 into a safety gate position by stops 34 which will prevent the wheelchair from rolling backwardly off the ramp as the ramp is raising. If the wheelchair is not forward far enough on plate 16, the raising ramp 24 will push the chair forward until anchors 30 engage brackets 36. Elevation of door D by control of the buttons on control pedestal 60 is continued until door D is raised to a point where access ramp 14 is at or near a horizontal position, at which time the control buttons at station 66 on pedestal 60 is released and the chair rolled into the interior of the vehicle. Completion of the raising of the door may then be performed by manipulation of the UP switch at control station 64.

To leave the vehicle, the process is reversed, opening of the door being under the control of the switch station 64 until the ramp assembly is approximately in the position shown in FIG. 3, at which time the chair is rolled onto the ramp and final lowering of the ramp to the fully lowered ground contacting position is accomplished under the control of the appropriate button at station 66.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In combination with a vehicle having a frame, a floor, and means defining a generally rectangular door opening; an access ramp assembly providing access between the vehicle floor and the ground, said ramp assembly comprising a door adapted to close said door opening, pivot means mounting the lower edge of said door upon said frame for pivotal movement about a horizontal axis extending parallel to the respective lower edges of said door and said door opening, reversible power lift means mounted on said frame and coupled to said door for raising and lowering said door about said axis between a closed position closing said door opening and a lowered position wherein said door projects outwardly from the lower edge of said opening with the outer end portion of the projected door supported upon the ground, means on the inner surface of said door defining a main ramp surface, first ramp means mounted on said door and operable to define a first ramp between the ground and said main ramp surface when said door is in said lowered position, second ramp means mounted on the vehicle floor operable to define a second ramp extending between said main ramp surface and said vehicle floor when said door is in a fully or partially lowered position, said second ramp means comprising a generally rectangular second ramp plate, hinge means mounting said plate on said floor for hinging movement about a hinge axis parallel to said horizontal axis and extending generally along one edge of said plate, the opposite edge of said plate being slidably engaged with said main ramp surface during raising and lowering movement of said door, and anti-rattle means for maintaining said plate out of engagement with said ramp surface when said door is in its closed position.

2. The invention defined in claim 1 further comprising first lift control means mounted upon and movable with said ramp assembly for controlling operation of said lift means.

3. The invention defined in claim 1 further comprising first lift control means for controlling operation of said lift means mounted on said plate for movement therewith, said first lift control means including a control pedestal projecting from said plate to a distal end accessible to a person seated in a wheelchair located on said ramp assembly when said door is in a fully or partially lowered position, and lift control elements mounted adjacent the distal end of said pedestal.

4. The invention defined in claim 3 further comprising second and third lift control means located respectively on the exterior and interior of said vehicle adjacent a side of said door opening, said second control means being accessible to a person seated in a wheelchair outside said vehicle.

5. The invention defined in claim 1 further comprising remote control means for controlling operation of said lift operable by a person seated in a wheelchair.

6. The invention defined in claim 1 wherein said power lift means comprises rotary shaft means rotatably mounted on said frame for rotation about a drive axis parallel to said horizontal axis adjacent the upper edge of said door opening, reversible motor means drivingly coupled to said shaft means, flexible tension means coupled at one end to said shaft means to be wound upon or unwound from said shaft means upon rotation thereof, and coupling means coupling the other end of said tension means to the end of said door remote from said pivot means to raise or lower said door as said tension means is wound onto or unwound from said shaft means.

7. The invention defined in claim 6 wherein said first ramp means is hingedly mounted upon said door for pivotal movement about a second axis parallel to said horizontal axis extending generally along the upper edge of said door, spring means biassing said first ramp means about said second axis in a direction increasing the included angle between said first ramp means and said main ramp surface, coupling means including means coupling one end of said tension means to said first ramp means at a location displaced from said second axis to pivot said first ramp means against the action of said spring means upon the application of tension to said tension means, and stop means limiting pivotal movement of said first ramp means by said tension means to a position wherein the included angle between said main ramp surface and said first ramp means is approximately 90°.

8. The invention defined in claim 6 wherein the motive force for lowering said door is gravity, said lift means controlling the rate of speed of said door in lowering movement, and resilient means biassing said door away from said closed position to initiate lowering movement of said door from said closed position.

9. In combination with a van-type vehicle having a frame, a floor, and means defining a generally rectangular door opening having upper and lower edges; an access ramp assembly providing access between the vehicle floor and the ground, said ramp assembly comprising a door adapted to close said door opening with said door having upper and lower edges, pivot means mounting said door on said frame adjacent the lower edge of said means defining said door opening for pivotal movement about a horizontal axis extending parallel to and adjacent the lower edge of the door opening, lift means mounted on said frame adjacent the upper edge of said means defining said door opening and connected with the upper portion of said door for raising and lowering said door about said axis between a closed position closing said door opening and a lowered position wherein said rear projects outwardly from said vehicle with the outer end of said door supported upon the ground, first means on the inner surface of said door defining a main ramp surface when said door is in said lowered position, and second means defining a transition ramp surface extending from the vehicle floor to said main ramp surface when said door is in said lowered position or in positions immediate said closed and said lowered positions, said means defining said main ramp surface comprising a plate-like member fixedly secured to the inner surface of said door, said door having a recess in its inner surface extending along the major portion of its upper edge, said plate-like member having a depressed portion extending across said recess to define a transition surface inclined from a first location closely adjacent the outer surface of the door along its upper edge to a location overlying the inner surface of the door at a location spaced inwardly of the door from its upper edge to provide a reduced incline between the ground and the inner surface of the door when the door is in its lowered position, said access ramp assembly also including an approach ramp hingedly mounted on the upper edge of said door along said depressed portion, and means on said lift means operably to hinge said approach ramp upwardly to define a safety gate at the outer end of said ramp assembly during raising and lowering movement of said lift, said lift means comprising a pair of straps, anchor means mounted on opposite sides of said approach ramp respectively connected to one end of each strap, bracket means adjacent the upper edge of said door at each side of said depressed portion, said straps passing from said anchors through said bracket means, rotatable shaft means mounted within said vehicle adjacent the upper edge of said door and coupled to the other ends of said straps to raise or lower said door as said straps are wound upon or unwound from said shaft means, anchors being engageable with said brackets upon the application of tension to said straps to locate said approach ramp in said safety gate position, and spring means biassing said approach ramp away from said safety gate position.

10. In combination with a van-type vehicle having a frame, a floor, and means defining a generally rectangular door opening having upper and lower edges; an access ramp assembly providing access between the vehicle floor and the ground, said ramp assembly comprising a door adapted to close said door opening with said door having upper and lower edges, pivot means mounting said door on said frame adjacent the lower edge of said means defining said door opening for pivotal movement about a horizontal axis extending parallel to and adjacent the lower edge of the door opening, lift means mounted on said frame adjacent the upper edge of said means defining said door opening and connected with the upper portion of said door for raising and lowering said door about said axis between a closed position closing said door opening and a lowered position wherein said rear projects outwardly from said vehicle with the outer end of said door supported upon the ground, first means on the inner surface of said door defining a main ramp surface when said door is in said lowered position, and second means defining a transition ramp surface extending from the vehicle floor to said main ramp surface when said door is in said lowered position or in positions immediate said closed and said lowered positions, said second ramp means comprising a generally rectangular plate; hinge means mounting one edge of said plate upon said floor for pivotal movement about a pivot axis parallel to said horizontal axis, the opposite edge of said plate being slidably engaged with said main ramp surface during raising and lowering of said door, and wherein said pivot axis is offset inwardly of said vehicle from said horizontal axis whereby said plate is inclined upwardly and outwardly of said vehicle when said door is in said closed position, and resilient means pivotally biassing said opposite edge of said plate toward said main ramp surface.

11. The invention defined in claim 10 further comprising anti-rattle means for holding said plate out of contact with said main ramp surface when said door is in its closed position.

12. In combination with a vehicle having a frame, a floor, and means defining a generally rectangular door opening; an access ramp assembly providing access between the vehicle floor and the ground, said ramp assembly comprising a door adapted to close said door opening, pivot means mounting the lower edge of said door upon said frame for pivotal movement about a horizontal axis extending parallel to the respective lower edges of said door and said door opening, reversible power lift means mounted on said frame and coupled to said door for raising and lowering said door about said axis between a closed position closing said door opening and a lowered position wherein said door projects outwardly from the lower edge of said opening with the outer end portion of the projected door supported upon the ground, means on the inner surface of said door defining a main ramp surface, first ramp means mounted on said door and operable to define a first ramp between the ground and said main ramp surface when said door is in said lowered position, second ramp means mounted on the vehicle floor operable to define a second ramp extending between said main ramp surface and said vehicle floor when said door is in a fully or partially lowered position, and first lift control means mounted upon and movable with said ramp assembly for controlling operation of said lift means.

13. In combination with a vehicle having a frame, a floor, and means defining a generally rectangular door opening, an access ramp assembly providing access between the vehicle floor and the ground, said ramp assembly comprising:

a door adapted to close said door opening;

pivot means mounting the lower edge of said door upon said frame for pivotal movement about a substantially horizontal axis extending parallel to the respective lower edges of said door and said door opening;

reversible power lift means mounted on said frame and coupled to said door for raising and lowering said door about said axis between a closed position closing said door opening and a lowered position wherein said door projects outwardly from the lower edge of said opening with the outer end portion of the projected door contiguous to the ground;

means on the inner surface of said door defining a ramp surface for supporting a person; and lift control means mounted upon and movable with said door whereby a person on said ramp surface can control operation of said power lift means.

* * * * *